(12) United States Patent
Tramoni

(10) Patent No.: US 9,853,677 B2
(45) Date of Patent: Dec. 26, 2017

(54) METHOD FOR CONTROLLING THE TUNING TO A COMMUNICATIONS FREQUENCY OF AN ANTENNA CONNECTED TO A COMPONENT DESIGNED FOR CONTACTLESS COMMUNICATION AND CORRESPONDING SYSTEM

(71) Applicant: STMICROELECTRONICS (ROUSSET) SAS, Rousset (FR)

(72) Inventor: Alexandre Tramoni, Le Beausset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 14/974,146

(22) Filed: Dec. 18, 2015

(65) Prior Publication Data
US 2016/0359519 A1    Dec. 8, 2016

(30) Foreign Application Priority Data

Jun. 2, 2015    (FR) ...................... 15 54987

(51) Int. Cl.
*H04B 5/00*    (2006.01)
*H04B 1/40*    (2015.01)
*H04B 1/18*    (2006.01)

(52) U.S. Cl.
CPC ................. *H04B 1/40* (2013.01); *H04B 1/18* (2013.01); *H04B 5/0025* (2013.01)

(58) Field of Classification Search
CPC .......... H04B 1/0475; H04B 1/40; H04B 1/04; H04B 5/0056
USPC ........................................................ 455/41.1
See application file for complete search history.

(56) References Cited

U.S. PATENT DOCUMENTS

| 9,306,630 | B2 | 4/2016 | Dhayni | |
| 2010/0248653 | A1* | 9/2010 | Merlin | G06K 19/07749 455/90.1 |
| 2014/0106668 | A1* | 4/2014 | Krishnan | G06K 7/0008 455/41.1 |
| 2015/0065043 | A1 | 3/2015 | Heng et al. | |
| 2015/0178526 | A1* | 6/2015 | Roh | H01Q 7/00 235/439 |

FOREIGN PATENT DOCUMENTS

EP    2824846    1/2015

\* cited by examiner

*Primary Examiner* — Yuwen Pan
*Assistant Examiner* — Fatuma Sherif
(74) *Attorney, Agent, or Firm* — Slater Matsil, LLP

(57) ABSTRACT

A system includes an antenna, and a contactless component for receiving and/or transmitting information via the antenna according to a contactless communications protocol. An inductive-capacitive network is connected between the antenna and the contactless component and includes a configurable filter for filtering electromagnetic interference. A processor modifies an impedance of the configurable filter for filtering electromagnetic interference to control frequency tuning of the antenna.

32 Claims, 5 Drawing Sheets

METHOD FOR CONTROLLING THE TUNING TO A COMMUNICATIONS FREQUENCY OF AN ANTENNA CONNECTED TO A COMPONENT DESIGNED FOR CONTACTLESS COMMUNICATION AND CORRESPONDING SYSTEM

FIELD OF THE INVENTION

Various embodiments of the invention and their implementation relate to wireless or contactless communications using electronic components connected to an antenna. This notably includes components configured for exchanging information with an external device via the antenna according to a communications protocol of the contactless type and, more particularly, the control of frequency tuning of the antenna.

The antenna is tuned to a frequency compatible with contactless communications of information. Such a frequency may, for example, be a resonance frequency equal to a carrier frequency, for example, 13.56 MHz, or a resonance frequency contained within an admissible range around the carrier frequency.

BACKGROUND

Such components are more simply referred to as contactless components and may, for example, be components known as NFC components. These components are compatible with NFC (Near Field Communication) technology. The NFC component may, for example, be an NFC microcontroller.

The acronym NFC (Near Field Communication) denotes a short-distance, high-frequency, wireless communications technology, which enables exchanges of data between two contactless devices over a short distance, for example, 10 cm.

NFC technology is standardized in documents ISO/IEC 18 092 and ISO/IEC 21 481, but incorporates a variety of pre-existing standards including the type A and type B protocols of the standard ISO/IEC 14 443.

An NFC microcontroller can generally be used either in reader mode or in card mode to establish a dialog with another contactless device, for example, using a contactless communications protocol such as the type A protocol of the standard ISO/IEC 14 443.

In reader mode, the NFC component functions as a reader with respect to the external contactless device which can then be a card or a tag. In reader mode, the NFC component can then read the contents of the external device and write information into the external device.

In card mode, the NFC component then functions as a card or a tag and establishes a dialog with the external device which is this time a reader.

An NFC microcontroller may, for example, be incorporated into a cellular mobile telephone, and the latter can then be used, aside from its conventional telephone function, for exchanging information with the external contactless device.

Numerous applications are thus possible, such as the passage through a toll gate in transportation applications (the mobile telephone acts as a travel ticket) or else payment applications (the mobile telephone acts as a credit card).

The contactless components, such as NFC components, are generally connected to the antenna via an impedance matching circuit to optimize the radio frequency communications. Furthermore, these external components used in this impedance matching circuit, for example, coils and capacitors, need to be precisely dimensioned in such a manner as to allow a correct frequency tuning of the antenna, for example, onto a carrier frequency. For example, the carrier frequency may be 13.56 MHz. This ensures an increased or maximum level of performance.

Generally speaking, differences exist between the theoretical values of these external components and of the antenna and the real values of the latter when they are effectively implemented and physically connected to the NFC component. This is notably due to the technology dispersions in the external components and in the antenna used which can be more significant the lower the quality, notably, of the external components.

This then results in a frequency detuning of the antenna. This frequency detuning of the antenna may also be caused by the magnetic coupling with the antenna of another NFC object.

SUMMARY

Frequency tuning of the antenna is performed to limit the risk of frequency detuning of the antenna which would lead to poor communications of information or even an interruption of the communications.

Generally speaking, the impedance matching circuit may incorporate a configurable filter designed or configured to filter electromagnetic interference (EMI). More precisely, this EMI filter, which is generally an inductive-capacitive filter (LC filter), may allow the high harmonic emissions of the transmission signal, typically at 13.56 MHz, to be reduced.

The impedance of the EMI filter may be modified to compensate a frequency detuning of the antenna due notably to the technology dispersions in the external components and/or in the antenna and/or to the effect of electromagnetic coupling.

According to another aspect, a method for controlling a frequency tuning of an antenna connected to a component via an inductive-capacitive network may comprise configurable filter means or a configurable filter for filtering electromagnetic interference. The component may be configured for receiving and/or transmitting information via the antenna according to a contactless communications protocol. The method may comprise a modification of the impedance of the configurable filter for filtering electromagnetic interference.

The configurable filter may be configurable for taking various filtering configurations all having substantially the same reference cut-off frequency. The modification of the impedance of the configurable electromagnetic filtering may comprise selection of the filtering configuration for which the current flowing in the antenna has the highest or increased value.

According to another aspect, a system may comprise an antenna, a component configured for receiving and/or transmitting information via the antenna according to a contactless communications protocol, and an inductive-capacitive network connected between the antenna and the component. The inductive-capacitive network may comprise a configurable filter for filtering electromagnetic interference.

The system may furthermore comprise processing means or a processor configured for modifying the impedance of the configurable filter for filtering electromagnetic interference so as to control a frequency tuning of the antenna.

According to one embodiment, the configurable filter for filtering electromagnetic interference may be configurable to take various filtering configurations all having substantially the same reference cut-off frequency. The processor may comprise the configurable filter for filtering electromagnetic interference. Control means or a controller may be configured for selecting the filtering configuration for which the current flowing in the antenna has the highest or increased value.

The configurable filter may have a reference inductance and a reference capacitive value associated with the reference cut-off frequency.

The configurable filter may comprise a configurable inductive-capacitive circuit connected between the component and the terminals of the antenna, and a configurable capacitive circuit may be connected between the inductive-capacitive circuit and a neutral point, such as ground, for example.

The configurable inductive-capacitive circuit may comprise an inductive-capacitive module configurable by a first set of switchable auxiliary capacitive circuits. The configurable capacitive circuit may comprise a capacitive module configurable by a second set of switchable auxiliary capacitive circuits.

In each filtering configuration, the impedance of the inductive-capacitive circuit at the cut-off frequency may be equal to the reference inductance and the impedance of the capacitive circuit at the cut-off frequency that is equal to the reference capacitive value.

In one of the filtering configurations, no auxiliary capacitive circuit may be connected to the terminals of the inductive-capacitive module and no auxiliary capacitive circuit may be connected to the terminals of the capacitive module. In each other filtering configuration, an auxiliary capacitive circuit of the first set may be connected to the terminals of the inductive-capacitive module and an auxiliary capacitive circuit of the second set may be connected to the terminals of the capacitive module.

The first and second sets of switchable auxiliary capacitive circuits may advantageously be situated inside the component. For this purpose, the component may comprise a first output terminal and a second output terminal for the transmission of data to the antenna, and first and second auxiliary terminals.

The inductive-capacitive module may comprise a first block connected between the first output terminal and a first terminal of the antenna. The first block may comprise a first main inductive element connected in parallel to the terminals of a first main capacitor.

The inductive-capacitive module may comprise a second block connected between the second output terminal and a second terminal of the antenna. The second block may comprise a second main inductive element connected in parallel to the terminals of a second main capacitor.

The capacitive module may comprise a first additional capacitor connected in series between the first block and the neutral point and a second additional capacitor connected in series between the second block and the neutral point.

The first set of auxiliary capacitive circuits may comprise a first assembly of switchable auxiliary capacitors connected in parallel between the first auxiliary terminal and the first output terminal, and a second assembly of switchable auxiliary capacitors connected in parallel between the second auxiliary terminal and the second output terminal.

The second set of auxiliary capacitive circuits may comprise a third assembly of switchable auxiliary capacitors connected in parallel between the first auxiliary terminal and the neutral point and a fourth assembly of switchable auxiliary capacitors connected in parallel between the second auxiliary terminal and the neutral point.

The component may comprise first and second input terminals connected to the two terminals of the antenna for receiving data from the antenna, and the controller may comprise a detector configured for detecting the highest or increased voltage on the terminals of the antenna. The component may advantageously be capable of operating in reader mode or in card mode.

According to another aspect, a wireless communications device may be provided, for example, a cellular mobile telephone, configured to operate in reader mode or in card mode, and comprising a system as defined above.

BRIEF DESCRIPTION OF THE DRAWINGS

Other advantages and features of the invention will become apparent from the detailed description of non-limiting embodiments and their implementation, and from the appended drawings in which.

DETAILED DESCRIPTION

Figure 1:
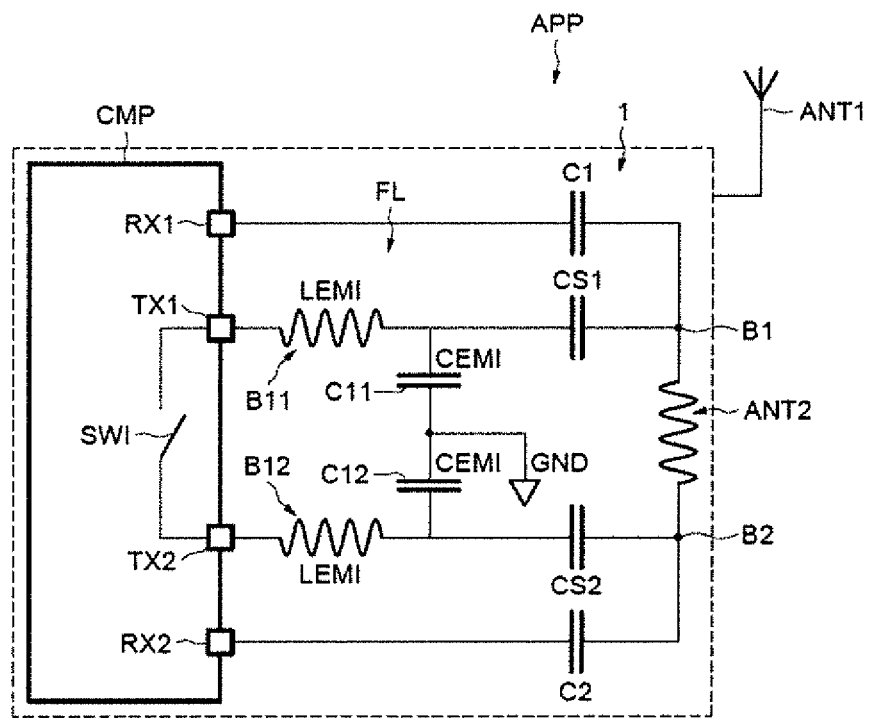
FIG. 1 illustrates one example of the prior art.

In FIG. 1, the reference APP denotes a communications device, for example, a cellular mobile telephone, equipped with an antenna ANT1 for establishing telephone communications. In the present case, the device APP also comprises a conventional NFC system comprising a contactless component CMP of the NFC type, for example, an NFC microcontroller.

The microcontroller CMP conventionally comprises two contacts TX1, TX2 usable in reader mode and two others contacts RX1, RX2 usable in reader mode and in card mode. For this purpose, the component CMP may be equipped with an internal switch SWI allowing the terminals TX1 and TX2 to be short-circuited for an operation in card mode or not allowing the terminals TX1 and TX2 to be short-circuited for enabling an operation in reader mode.

An antenna ANT2, for example, a single inductive winding, may be used for contactless communication with an external device. A first terminal B1 of this antenna ANT2 is connected to the contacts TX1 and RX1, whereas the second terminal B2 of the antenna ANT2 is connected to the contacts TX2 and RX2.

An external impedance matching circuit is connected between the antenna ANT2 and the component CMP. More precisely, conventionally and in a manner known by those skilled in the art, this impedance matching circuit can comprise a filter FL configured to filter electromagnetic interference (EMI filter).

This filter FL is conventionally a filter of the LC type here comprising a coil B11 connected in series with a capacitor C11 between the contact TX1 and ground GND. The filter FL also comprises a coil B12 connected in series with a capacitor C12 between the contact TX2 and ground GND.

The inductances of the coil B11 and the coil B12 are equal to LEMI, whereas the capacitive value of the capacitors C11 and C12 is equal to CEMI. These two values respectively form a reference inductance and a reference capacitive value for the EMI filter.

These reference values are associated with a cut-off frequency of the EMI filter, denoted below as a reference cut-off frequency (for example, 20 MHz for a carrier frequency of 13.56 MHz).

Furthermore, these reference values LEMI and CEMI are chosen so as to form a circuit that is resonant around the reference cut-off frequency f of the filter FL. Thus, the reference values CEMI and LEMI satisfy the formula (1) below.

$$CEMI = \frac{1}{(2\pi f)^2 LEMI} \quad (1)$$

The impedance matching circuits also comprise the capacitors C1, C2, CS1 and CS2. The capacitors C1 and C2 form a capacitive divider at the terminals of the contacts RX1 and RX2. The capacitors CS1 and CS2 are, on the other hand, chosen to maximize the current in the antenna ANT2 so as to increase the amplitude of the electromagnetic field.

In such a manner as to obtain an optimized operation, the component CMP forms, with the antenna ANT2 and the external impedance matching circuit, a resonant circuit having a resonance frequency equal to the carrier frequency, for example, 13.56 MHz in the case of a type A or type B communications protocol defined in the standard ISO/IEC 14443.

However, in the case of a type A transmission protocol, resonance frequencies contained within a range of +/−15% around the carrier frequency can be considered as acceptable resonance frequencies.

However, when the external impedance matching circuit is effectively implemented, the real inductances and the real capacitive values of the various elements of this external impedance matching circuit can vary with respect to the theoretical values owing notably to the technological dispersion in the coils and capacitors used.

The antenna ANT2 may then no longer be tuned to an acceptable resonance frequency allowing a correct communication of the information. This frequency detuning of the antenna may also be produced by the electromagnetic coupling with the antenna of the external device communicating with the component CMP.

Figure 2:
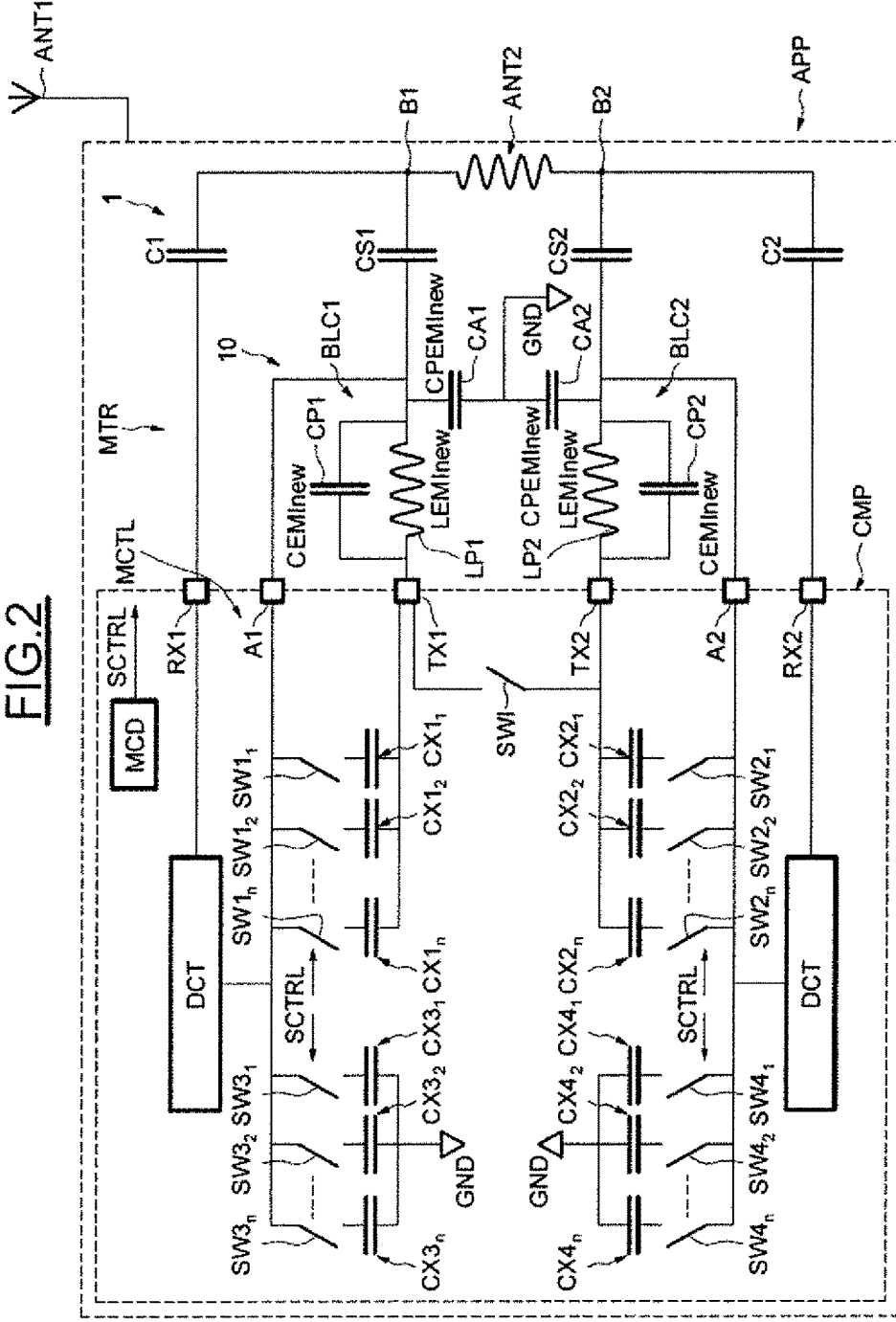
FIGS. 2 to 5 illustrate schematically various embodiments of the invention and their implementation.

To overcome this drawback and to control a frequency tuning of the antenna ANT2 to an acceptable resonance frequency, according to one embodiment illustrated in FIG. 2, the system comprising the antenna ANT2, the component CMP and the inductive-capacitive network 1, connected between the antenna ANT2 and the component CMP, furthermore comprises processing means or a processor MTR configured for modifying the impedance of the filter for filtering electromagnetic interference to control a frequency tuning of the antenna to an acceptable resonance frequency (frequency equal to or close to the carrier frequency, for example), for example, 13.56 MHz.

For purposes of simplification, only the differences between FIG. 2 and FIG. 1 will now be described. It is recalled that the contacts TX1 and TX2 form a first and second output terminal of the component CMP for the transmission of data to the antenna ANT2, whereas the contacts RX1 and RX2 form two input terminals of the component for receiving data coming from the antenna ANT2.

The configurable filter 10 for filtering electromagnetic interference is configurable to take various filtering configurations all having substantially the same reference cut-off frequency f, for example, 20 MHz.

The processor MTR then comprises these configurable filtering settings 10 and control means or controller MCTL configured for selecting the filtering configuration for which the current flowing in the antenna ANT2 has the highest or increased value.

The configurable filter 10 will now be described in more detail. The latter comprise a first block BLC1 connected between the first output terminal (contact TX1) of the component and the first terminal B1 of the antenna ANT2. The first block BLC1 comprises a first main inductive element LP1 connected in parallel to the terminals of a first main capacitor CP1.

A second block BLC2 is connected between the second output terminal (contact TX2) of the component CMP and the second terminal B2 of the antenna ANT2. The second block BLC2 comprises a second main inductive element LP2 connected in parallel to the terminals of a second main capacitor CP2.

The main inductive elements LP1 and LP2 are advantageously identical. Similarly, the main capacitors CP1 and CP2 are also advantageously identical.

The two blocks BLC1 and BLC2 together form an inductive-capacitive module. The configurable filter 10 also comprises a first additional capacitor connected in series between the first block BLC1 and ground GND, and a second additional capacitor CA2 connected in series between the second block BLC2 and ground GND. These two additional capacitors CA1 and CA2 form a capacitive module.

As can furthermore be seen in FIG. 2, the component CMP also comprises two auxiliary contacts A1 and A2 respectively forming first and second auxiliary terminals.

The configurable filter 10 also comprises a first assembly of auxiliary capacitors $CX1_1$-$CX1_n$ respectively switchable by switches $SW1_1$-$SW1_n$, for example, MOS transistors. The first assembly of switchable auxiliary capacitors $CX1_1$-$CX1_n$ are connected in parallel between the first auxiliary terminal A1 and the first output terminal TX1 of the component.

The configurable filter 10 also comprises a second assembly of auxiliary capacitors $CX2_1$-$CX2_n$ respectively switchable by switches $SW2_1$-$SW2_n$, and connected in parallel between the second auxiliary terminal A2 and the second output terminal TX2 of the component CMP.

The first assembly of switchable auxiliary capacitors and the second assembly of switchable auxiliary capacitors form a first set of auxiliary capacitive circuits. Two common auxiliary capacitors $CX1_i$ and $CX2_i$ have, for example but not necessarily, the same capacitive value.

The configurable filter 10 also comprises a third assembly of auxiliary capacitors $CX3_1$-$CX3_n$ respectively switchable by switches $SW3_1$-$SW3_n$, and connected in parallel between the first auxiliary terminal A1 and ground GND.

The configurable filter 10 also comprises a fourth assembly of auxiliary capacitors $CX4_1$-$CX4_n$ respectively switchable by switches $SW4_1$-$SW4_n$, and connected in parallel between the second auxiliary terminal A2 and ground GND. Here again, two common capacitors $CX3_i$, $CX4_i$ have, for example, but not necessarily, the same capacitive value.

Furthermore, two common capacitors $CX1_i$ and $CX3_i$ may or may not have the same capacitive value. In addition, the two common capacitors $CX2_i$ and $CX4_i$ may or may not have the same capacitive value.

The third assembly of switchable auxiliary capacitors and the fourth assembly of switchable auxiliary capacitors form a second set of auxiliary capacitive circuits.

The component CMP therefore incorporates, aside from processing information received or sent out, all the assemblies of the auxiliary capacitors $CX1_i$, $CX2_i$, $CX3_i$, $CX4_i$. It is preferable to place the auxiliary capacitors inside of the component CMP in order not to oblige the user to add them to the exterior of the product. The cost of implementation of the circuit will accordingly be reduced for the user.

The controller MCTL also comprises a module MCD, based, for example, on logic circuits, configured to generate a control signal SCTRL for controlling the various switches SW1-SW4. This will allow the configuration of the configurable filter to be modified as will now be explained in more detail.

In FIG. 2, all the switches SW1-SW4 have been shown in the open position corresponding to a first configuration of the configurable filter 10. In the first configuration, the configurable filter 10 is formed by the first block BLC1 and the second block BLC2.

To switch into another filtering configuration, the control means or controller MC2 sends commands to the switches so as, for example, to simultaneously close the four common switches $SW1_i$, $SW2_i$, $SW3_i$ and $SW4_i$. For this reason, the auxiliary capacitor $CX1_i$ is added in parallel to the first main capacitor CP1 and the auxiliary capacitor $CX2_i$ is added in parallel to the second main capacitor CP2. Similarly, the auxiliary capacitor $CX3_i$ is added in parallel to the first additional capacitor CA1 and the auxiliary capacitor $CX4_i$ is added in parallel to the second additional capacitor CA2.

By adding $CX1_i$ (respectively $CX2i$), the equivalent value of the inductance of the configurable filter 10 is reduced. To keep the same cut-off frequency of the configurable filter 10, $CX3_i$ (respectively $CX4_i$) is added such that the variation in cut-off frequency of the configurable filter 10 due to the addition of $CX1_i$ (respectively $CX2i$) is compensated by the addition of $CX3_i$ (respectively $CX4_i$). The inductance of each main inductive element LP1, LP2 is equal to LEMInew.

Furthermore, in each filtering configuration, the capacitive value connected in parallel to the terminals of each main inductive element LP1 or LP2 is equal to CEMInew. Of course, the capacitive value CEMInew is different according to the filtering configuration depending on the capacitor or capacitors effectively connected to the terminals of each main element LP1 or LP2.

Furthermore, the capacitive value connected in series between each block BLC1, BLC2 and ground GND is equal to CPEMInew. The capacitive value CPEMInew differs for each filtering configuration depending on the capacitor or capacitors connected in parallel between each block BLC1, BLC2 and ground GND.

However, in each filtering configuration, the impedance Z of each inductive-capacitive block formed by the block BLC1 or BLC2 to which, where needed, an auxiliary capacitor has been added, is given by formula (2):

$$Z = \frac{LEMInew \cdot \omega}{1 - LEMInew \cdot CEMInew \cdot \omega^2} \quad (2)$$

in which ω denotes the angular frequency corresponding to the reference cut-off frequency f of the electromagnetic interference filter, for example, 20 MHz.

Accordingly, the value LEMInew and the capacitive values of the various main and auxiliary capacitors will be chosen such that the impedance Z is, in each filtering configuration, equal to the reference inductance LEMI.

Furthermore, the capacitive value CPEMInew is defined by formula (3):

$$CPEMInew = \frac{1}{(2\pi f)^2 LEMI} \quad (3)$$

in which f denotes the reference cut-off frequency of the electromagnetic interference filter.

The capacitive values of the various additional and auxiliary capacitors are chosen in such a manner as to satisfy this condition for each filtering configuration.

Figure 3:
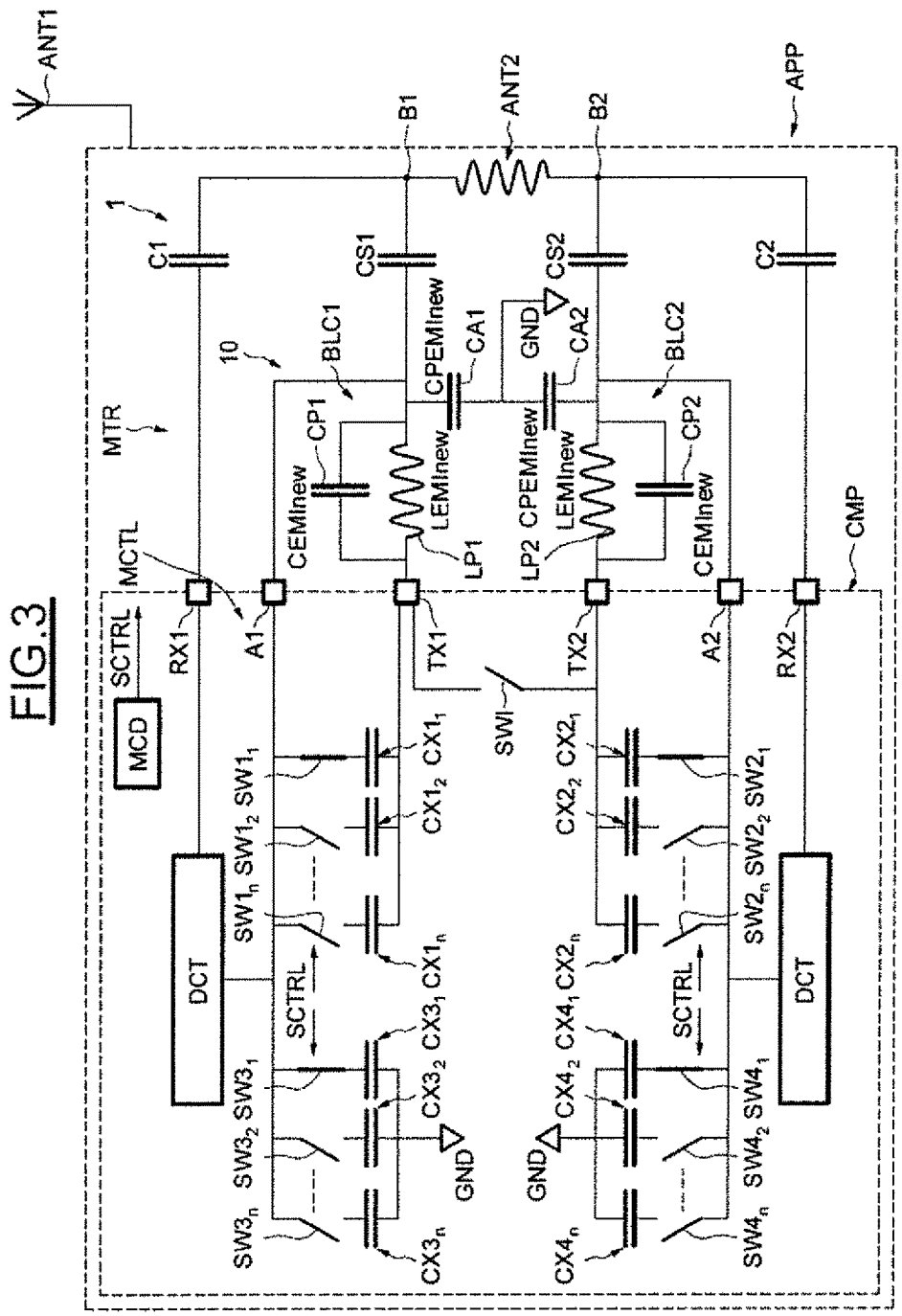

FIG. 3 illustrates, by way of example, another filtering configuration obtained by closing the switches $SW1_1$, $SW3_1$, $SW2_1$ and $SW4_1$. For this reason, in this filtering configuration, the additional capacitor $CX1_1$ is connected in parallel to the terminals of the main capacitor CP1 and the auxiliary capacitor $CX3_1$ is connected in parallel to the terminals of the additional capacitor CA1.

Similarly, the auxiliary capacitor $CX2_1$ is connected in parallel to the terminals of the main capacitor CP2 and the auxiliary capacitor $CX4_1$ to the terminals of the additional capacitor CA2.

Figure 4:
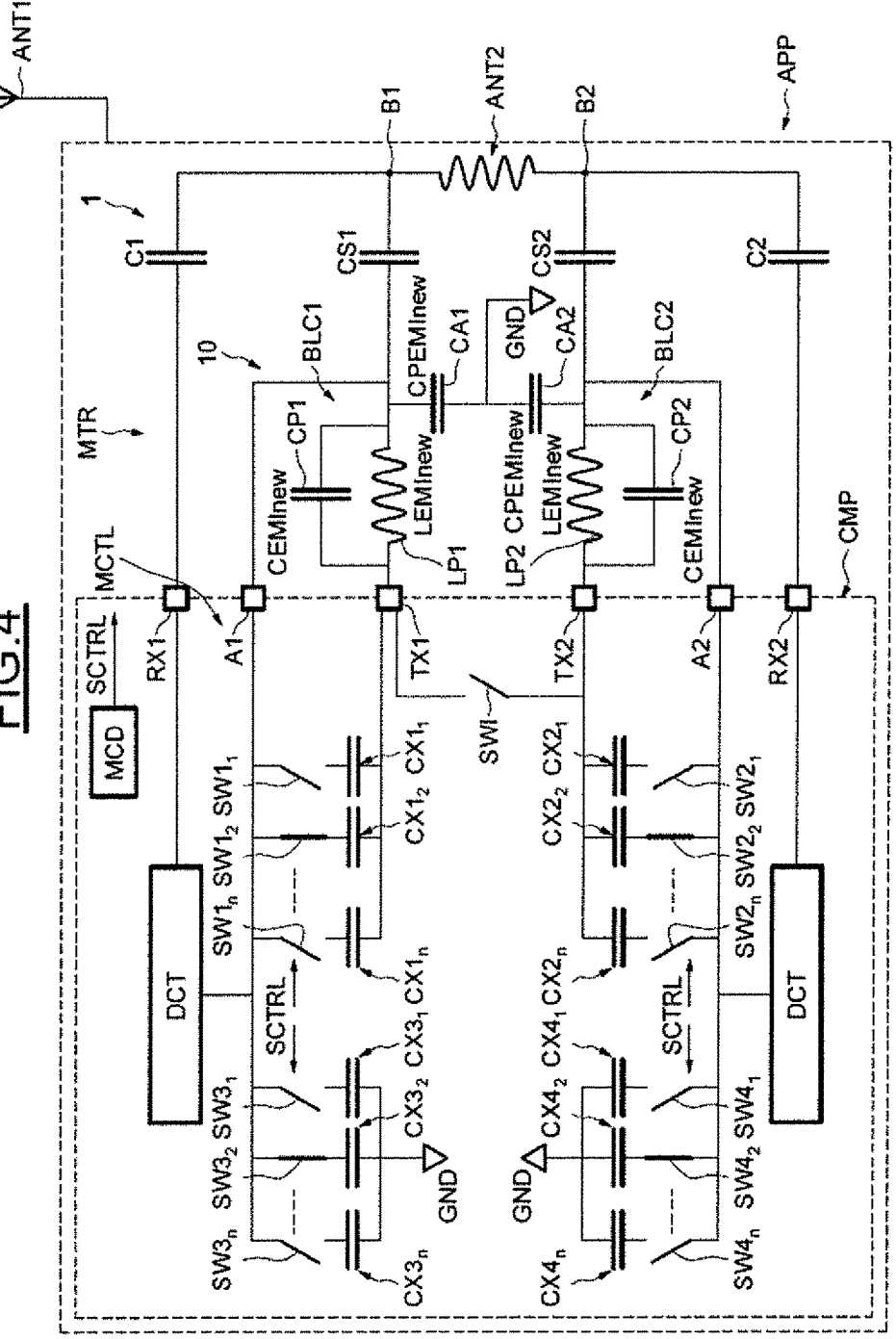

In FIG. 4, another filtering configuration is illustrated, obtained this time by closing the switches $SW1_2$, $SW3_2$, $SW2_2$ and $SW4_2$. In this filtering configuration, the additional capacitors $CX1_2$ and $CX2_2$ are connected in parallel to the terminals of the main capacitors CP1 and CP2 and the auxiliary capacitors $CX3_2$ and $CX4_2$ are connected in parallel to the terminals of additional capacitors CA1 and CA2.

Figure 5:
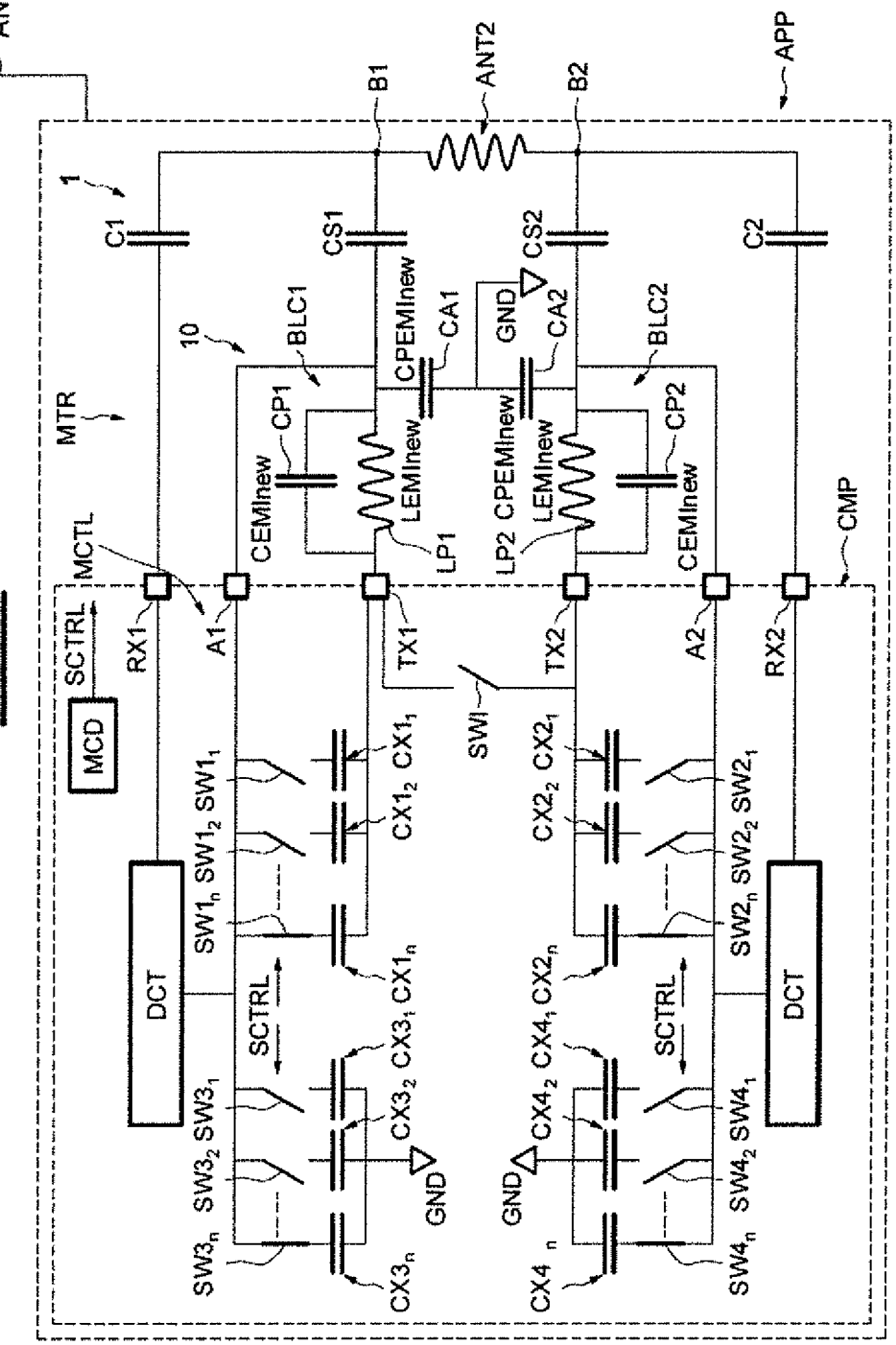

In FIG. 5, yet another filtering configuration is illustrated, obtained this time by closing the switches $SW1_n$, $SW3_n$, $SW2_n$ and $SW4_n$. In this filtering configuration, it is now the additional capacitors $CX1_n$ and $CX2_n$ that are connected in parallel to the terminals of the main capacitors CP1 and CP2 and the auxiliary capacitors $CX3_n$ and $CX4_n$ that are connected in parallel to the terminals of additional capacitors CA1 and CA2.

Once the system has been powered up, the controller MCTL will successively configure the configurable filter 10 in their successive filtering configurations to determine the filtering configuration leading to the highest value of current flowing in the antenna ANT2.

This filtering configuration will therefore correspond to that leading to the best tuning of the antenna ANT2 to a resonance frequency equal or close to that determined theoretically, for example, 13.56 MHz.

Of course, the number of auxiliary capacitors, and consequently the number of filtering configurations, result from a compromise between the surface area occupied and the desired granularity in the modification of the impedance of the configurable electromagnetic filter 10.

To determine the highest value of current flowing in the antenna ANT2, the controller may, for example, comprise one or here two detectors DCT connected between the terminals RX1 and RX2 and configured for detecting the greatest voltage difference across the terminals of the antenna ANT2.

The choice of the filtering configuration could be made statically once the system has effectively been assembled with the various components soldered. However, it could also be envisaged to make the choice of the configuration dynamically, in other words, for example, in the presence of an external device effectively coupled to the antenna ANT2, for example, at the start of each session for communication of information.

It goes without saying that what has just been described is valid in reader mode (switch SWI open) or in card mode (switch SWI closed).

The invention is not limited to the embodiments and their implementations that have just been described but encompasses all their variations.

Thus, although the switching of only one auxiliary capacitor per assembly of auxiliary capacitors has been described to define a filtering configuration, it could perfectly well be envisaged to switch several auxiliary capacitors within the same assembly.

Similarly, the capacitive values of two common transistors $CX1_i$ and $CX3_i$ (or $CX2_i$ and $CX4_i$) are not necessarily identical. To define a configuration, it may be chosen to close two or more than two switches that are not necessarily common.

It is in fact of little importance how (numbers of auxiliary capacitors used, number of switches closed or open, etc.) each filtering configuration is implemented as long as the impedance Z defined by formula (2) is, in each filtering configuration, equal or substantially equal to the reference inductance LEMI and the capacitive value CPEMInew is then obtained by formula (3).

Finally, it is not absolutely necessary for the capacitive values of two common transistors $CX1_i$ and $CX2_i$ (or $CX3_i$ and $CX4_i$) to be identical, notably if two detectors DCT respectively associated with the capacitors $CX1_i$ and $CX3_i$, on the one hand, and $CX2_i$ and $CX4_i$, on the other, are used.

The invention claimed is:

1. A system comprising:
an antenna;
a contactless component configured for exchanging information via the antenna according to a contactless communications protocol;
a configurable filter coupled between the antenna and the contactless component, the configurable filter configured to filter electromagnetic interference and is configurable to one of a plurality of filtering configurations that all have a cut-off frequency that is substantially the same and wherein the configurable filter comprises a reference inductance and a reference capacitive value associated with the reference cut-off frequency; and
a controller configured to modify an impedance of the configurable filter for filtering electromagnetic interference to control frequency tuning of the antenna by selecting one of the plurality of filtering configurations;
wherein the configurable filter comprises a configurable inductive-capacitive circuit coupled between the contactless component and terminals of said antenna and a configurable capacitive circuit coupled between said configurable inductive-capacitive circuit and a neutral point;
wherein the configurable inductive-capacitive circuit comprises a first set of switchable auxiliary capacitive circuits, and an inductive-capacitive module configurable by the first set of switchable auxiliary capacitive circuits;
wherein the configurable capacitive circuit comprises a second set of switchable auxiliary capacitive circuits, and a capacitive module configurable by the second set of switchable auxiliary capacitive circuits; and
wherein, in each filtering configuration, an impedance of the configurable inductive-capacitive circuit at the reference cut-off frequency is equal to the reference inductance, and an impedance of the configurable capacitive circuit at the reference cut-off frequency is equal to the reference capacitive value.

2. An apparatus comprising:
a contactless component having a first output terminal, a second output terminal, a first auxiliary terminal, and a second auxiliary terminal;
a configurable inductive-capacitive circuit coupled to the contactless component, the configurable inductive-capacitive circuit comprising:
a first main inductive element having a first input coupled to the first output terminal of the contactless component and a second input coupled to the first auxiliary terminal of the contactless component;
a second main inductive element having a first input coupled to the second output terminal of the contactless component and a second input coupled to the second auxiliary terminal of the contactless component;
a first main capacitor coupled in parallel to the first main inductive element;
a second main capacitor coupled in parallel to the second main inductive element;
a first plurality of switchable auxiliary capacitors, wherein each of the first plurality of switchable auxiliary capacitors is coupled between the first auxiliary terminal and the first output terminal of the contactless component; and
a second plurality of switchable auxiliary capacitors, wherein each of the second plurality of switchable auxiliary capacitors is coupled between the first auxiliary terminal and a neutral point;
a third plurality of switchable auxiliary capacitors, wherein each of the third plurality of switchable auxiliary capacitors is coupled between the second auxiliary terminal and the second output terminal of the contactless component; and
a fourth plurality of switchable auxiliary capacitors, wherein each of the fourth plurality of switchable auxiliary capacitors is coupled between the second auxiliary terminal and the neutral point.

3. The apparatus of claim 2, wherein the configurable inductive-capacitive circuit further comprises:
a first additional capacitor coupled between the first auxiliary terminal of the contactless component and the neutral point; and
a second additional capacitor coupled between the second auxiliary terminal of the contactless component and the neutral point.

4. The apparatus of claim 2, wherein the first main inductive element and the second main inductive element have identical inductance values.

5. The apparatus of claim 2, further comprising:
an antenna coupled to the configurable inductive-capacitive circuit and having a first terminal and a second terminal; and
a controller coupled to the configurable inductive-capacitive circuit.

6. The apparatus of claim 5, further comprising:
a third additional capacitor having a first input coupled to the first terminal of the antenna and having a second input coupled to the first auxiliary terminal of the contactless component; and
a fourth additional capacitor having a first input coupled to the second terminal of the antenna and having a second input coupled to the second auxiliary terminal of the contactless component.

7. The apparatus in claim 5, wherein the contactless component further comprises a first input terminal coupled to the first terminal of the antenna and a second input terminal coupled to the second terminal of the antenna, and wherein the apparatus further comprises:
a first detector having a first detector input coupled to the first input terminal of the contactless component and a second detector input coupled to the first plurality of switchable auxiliary capacitors and the second plurality of switchable auxiliary capacitors; and
a second detector having a first detector input coupled to the second input terminal of the contactless component and a second detector input coupled to the third plurality of switchable auxiliary capacitors and the fourth plurality of switchable auxiliary capacitors.

8. The apparatus of claim 2, wherein one or more of the first, the second, the third, and fourth plurality of switchable auxiliary capacitors are within the contactless component.

9. The apparatus of claim 2, wherein the contactless component further comprising a switch coupled to the first output terminal and the second output terminal of the contactless component.

10. The apparatus of claim 2, wherein the first main capacitor and the second main capacitor have identical capacitance values.

11. The apparatus of claim 2, wherein each of the first, second, third, and fourth plurality of switchable auxiliary capacitors comprise a plurality of capacitors and a plurality of switches.

12. The apparatus of claim 11, wherein each of the plurality of switches are MOSFET transistors.

13. The apparatus of claim 11, wherein each of the plurality of capacitors in the first plurality of switchable auxiliary capacitors and each of the plurality of capacitors in the third plurality of switchable auxiliary capacitors have identical capacitance values, and wherein each of the plurality of capacitors in the second plurality of switchable auxiliary capacitors and each of the plurality of capacitors in the fourth plurality of switchable auxiliary capacitors have identical capacitance values.

14. The apparatus of claim 11, wherein each of the plurality of capacitors in the first plurality of switchable auxiliary capacitors and each of the plurality of capacitors in the second plurality of switchable auxiliary capacitors have identical capacitance values, and wherein each of the plurality of capacitors in the third plurality of switchable auxiliary capacitors and each of the plurality of capacitors in the fourth plurality of switchable auxiliary capacitors have identical capacitance values.

15. An antenna frequency tuning system comprising:
a contactless component configured to exchange information in accordance with a contactless communications protocol;
a configurable inductive-capacitive circuit configured for impedance matching at a resonant frequency of an antenna, the configurable inductive-capacitive circuit comprising:
a first and second main inductive element configured to form a reference inductive value in accordance with the resonant frequency; and
a first and second main capacitor, wherein the first main capacitor is configured in a parallel resonant circuit with the first main inductive element, and wherein the second main capacitor is configured in a parallel resonant circuit with the second main inductive element;
a first set of auxiliary capacitive circuits comprising a first plurality of switchable auxiliary capacitors configured in accordance with a resonant frequency of the configurable inductive-capacitive circuit, equivalent to the resonant frequency, wherein a first subset of the first plurality of switchable auxiliary capacitors are configured in a parallel resonant circuit with the first main inductive element, and wherein a second subset of the first plurality of switchable auxiliary capacitors are configured in a parallel resonant circuit with the second main inductive element; and
a second set of auxiliary capacitive circuits comprising a second plurality of switchable auxiliary capacitors configured in accordance with the first set of auxiliary capacitive circuits.

16. The antenna frequency tuning system of claim 15, wherein the configurable inductive-capacitive circuit further comprises a first and second additional capacitor configured to form a reference capacitive value in accordance with the resonant frequency.

17. The antenna frequency tuning system of claim 16, wherein an impedance of the configurable inductive-capacitive circuit has an impedance equal to the reference inductive value in accordance with the resonant frequency.

18. The antenna frequency tuning system of claim 17, wherein an impedance of the configurable inductive-capacitive circuit has an impedance equal to the reference capacitive value in accordance with the resonant frequency.

19. The antenna frequency tuning system of claim 16, further comprising:
an antenna configured for contactless communication with an external device; and
a processor configured to switch the first and second set of auxiliary capacitive circuits.

20. The antenna frequency tuning system of claim 19, wherein the processor comprises:
a controller comprising a control module configured to generate a control signal for controlling the first and second set of auxiliary capacitive circuits; and
a plurality of detectors configured to detect a voltage difference across a first terminal and a second terminal of the antenna.

21. The antenna frequency tuning system of claim 19, wherein the processor is further configured to switch the first and second set of auxiliary capacitive circuits in accordance with a peak current flow in the antenna.

22. The antenna frequency tuning system of claim 19, further comprising a third and fourth additional capacitor configured to maximize a current in the antenna.

23. The antenna frequency tuning system of claim 15, wherein the contactless component further comprises a switch configured to operate the contactless component in a card mode or reader mode.

24. The antenna frequency tuning system in claim 15, wherein the resonant frequency is equivalent to a carrier frequency corresponding to a type A or type B ISO/IEC 14443 standard communications protocol.

25. The antenna frequency tuning system in claim 15, wherein one or more of the first and second set of auxiliary capacitive circuits are within the contactless component.

26. A method of impedance matching an antenna connected to a contactless component by a configurable inductive-capacitive parallel resonant circuit, the method comprising:
determining an impedance mismatch between the contactless component and the antenna;
configuring a first plurality of switches in a first set of auxiliary capacitive circuits of the configurable inductive-capacitive parallel resonant circuit in accordance with a resonant frequency equivalent to a carrier frequency; and configuring a second plurality of switches in a second set of auxiliary capacitive circuits in accordance with the configuring of the first plurality of switches in the first set of auxiliary capacitive circuits.

27. The method of claim 26, wherein determining the impedance mismatch comprises monitoring a voltage difference across terminals of the antenna.

28. The method of claim 26, wherein determining the impedance mismatch comprises monitoring a peak current flow at the antenna.

29. The method of claim 26, further comprising configuring the first plurality of switches and second plurality switches statically after device assembly.

30. The method of claim 26, further comprising configuring the first plurality of switches and second plurality switches dynamically in accordance with a presence of an external device coupled to the antenna.

31. The method of claim 30, wherein the first plurality of switches and second plurality switches are dynamically configured at a start of each session for communication of information.

32. The method of claim 26, further comprising operating the contactless component in a reader mode or a card mode.

* * * * *